US012566277B2

(12) United States Patent
Aab et al.

(10) Patent No.: US 12,566,277 B2
(45) Date of Patent: Mar. 3, 2026

(54) IONOSPHERIC DELAY MEASUREMENT FOR REDUCED GPS POWER CONSUMPTION

(71) Applicant: BAE SYSTEMS Information and Electronic Systems Integration Inc., Nashua, NH (US)

(72) Inventors: Steven D. Aab, Robins, IA (US); John E. Acheson, Anamosa, IA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 267 days.

(21) Appl. No.: 18/585,293

(22) Filed: Feb. 23, 2024

(65) Prior Publication Data

US 2025/0271578 A1 Aug. 28, 2025

(51) Int. Cl.
G01S 19/34 (2010.01)
G01S 19/07 (2010.01)
G01S 19/37 (2010.01)

(52) U.S. Cl.
CPC ............ G01S 19/34 (2013.01); G01S 19/072 (2019.08); G01S 19/37 (2013.01)

(58) Field of Classification Search
CPC ......... G01S 19/34; G01S 19/072; G01S 19/37
See application file for complete search history.

(56) References Cited

U.S. PATENT DOCUMENTS

| | | | |
|---|---|---|---|
| 4,894,662 A | 1/1990 | Counselman | |
| 6,407,700 B1 | 6/2002 | Giffard | |
| 6,781,542 B2 | 8/2004 | Hoven et al. | |
| 7,477,183 B2 | 1/2009 | Watson et al. | |
| 8,013,789 B2 | 9/2011 | van Graas et al. | |
| 9,784,846 B2 | 10/2017 | Sagiraju et al. | |
| 10,396,889 B2 * | 8/2019 | Floch ................ | H04B 7/18508 |
| 11,194,055 B2 | 12/2021 | Jackson et al. | |
| 11,550,065 B2 | 1/2023 | Wang et al. | |

(Continued)

FOREIGN PATENT DOCUMENTS

| | | |
|---|---|---|
| AU | 2010289870 B2 | 3/2011 |
| EP | 3789796 A1 | 3/2021 |

(Continued)

*Primary Examiner* — Cassi J Galt
(74) *Attorney, Agent, or Firm* — Scott J. Asmus

(57) ABSTRACT

Techniques are provided for power management of a global positioning system (GPS) receiver. A methodology implementing the techniques according to an embodiment includes calculating a pedestal ionospheric delay based on a phase difference between a first GPS signal at a first center frequency and a second GPS signal at a second center frequency. The method also includes powering off a processing chain configured to provide the second GPS signal. The method further includes calculating, at periodic intervals, a secondary ionospheric delay based on a phase difference between an upper sideband and a lower sideband of the first GPS signal and accumulating differences between consecutively calculated secondary ionospheric delays. The method further includes, in response to the accumulated differences exceeding a threshold value, powering on the processing chain configured to provide the second GPS signal and recalculating the pedestal ionospheric delay.

20 Claims, 8 Drawing Sheets

GPS Receiver with Ionospheric Delay Based Power Management
100

(56)            References Cited

U.S. PATENT DOCUMENTS

| | | |
|---|---|---|
| 11,585,948 B2 | 2/2023 | Muthuraman et al. |
| 11,675,090 B1 | 6/2023 | Chapman et al. |
| 11,754,723 B2 | 9/2023 | Srinivasan et al. |
| 2008/0174482 A1 | 7/2008 | Watson et al. |
| 2015/0198718 A1 | 7/2015 | Khalili et al. |
| 2019/0361129 A1 | 11/2019 | Pedersen Topland et al. |
| 2023/0095394 A1* | 3/2023 | Srinivasan .............. G01S 19/32 |
| | | 342/357.62 |

FOREIGN PATENT DOCUMENTS

| | | |
|---|---|---|
| WO | 02/063328 A2 | 8/2002 |
| WO | 2021/108595 A1 | 6/2021 |
| WO | 2022117802 A1 | 6/2022 |

* cited by examiner

GPS Receiver with Ionospheric Delay Based
Power Management
100

Secondary Ionospheric
Measurement Circuit
360

L1 upper Φ
340

L1 lower Φ
350

Differencing
Circuit
500

505

Rx Variation
Adjust
510

515

Phase Rate
Calculation
520

525

LPF
530

Secondary
Ionospheric Delay
370

700

Processing Platform
800

IONOSPHERIC DELAY MEASUREMENT FOR REDUCED GPS POWER CONSUMPTION

FIELD OF DISCLOSURE

The present disclosure relates to GPS receivers, and more particularly to power management for GPS receivers based on ionospheric delay measurement.

BACKGROUND

GPS technology has been adopted into widespread use to provide location, timing, and navigation assistance for countless applications. Many military applications depend on GPS, for example, to provide targeting of weapons systems and navigation functionality for aircraft, ships, ground vehicles, and ground troops. In some examples, such as man-portable applications, GPS receivers are battery powered and thus management of power consumption is important to extend battery life.

Figure 1:
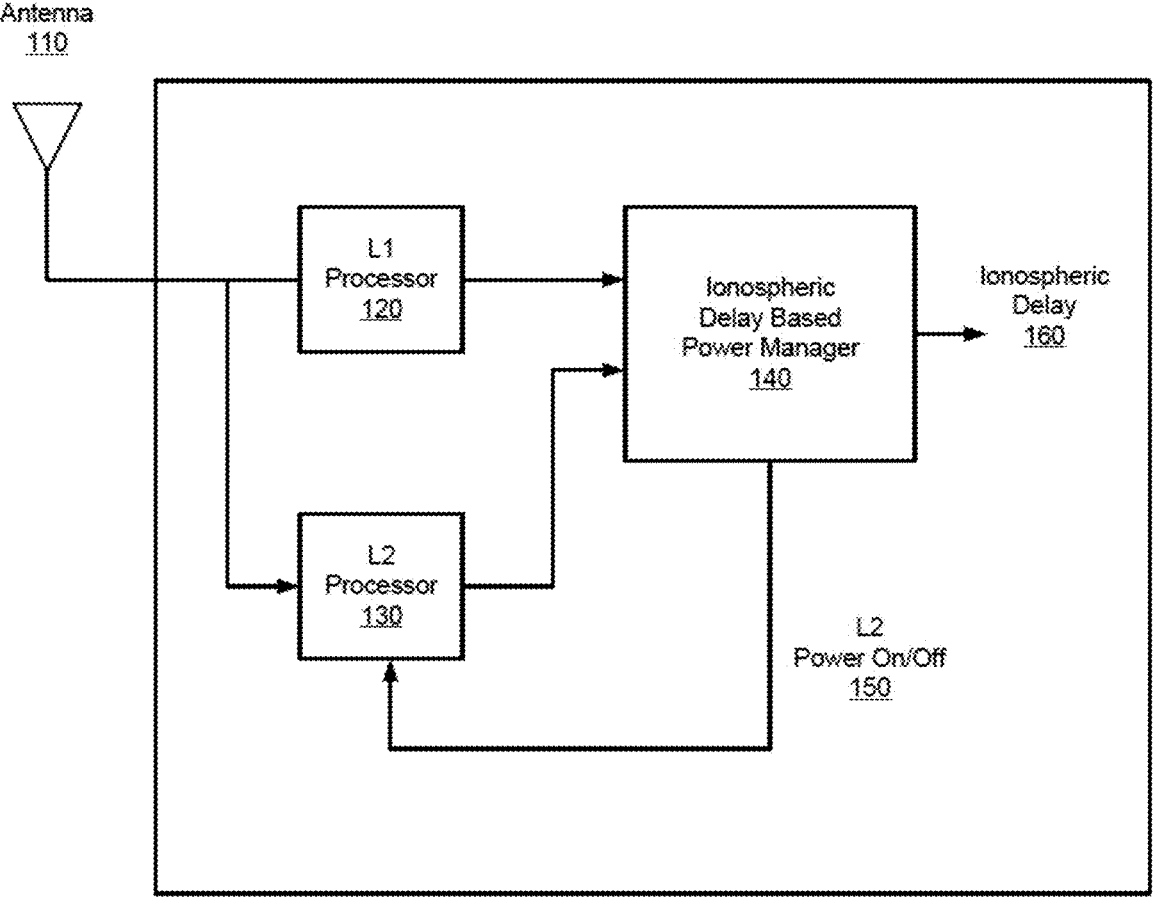
FIG. 1 illustrates a GPS receiver with ionospheric delay based power management, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided herein for power management of a global positioning system (GPS) receiver, based on iono- spheric delay measurements. In some applications, GPS receivers are power constrained in that they rely solely on battery power during use in the field and thus management of power consumption is important to extend battery life. The disclosed techniques allow for reduced power consump- tion and extended operation time to benefit such power constrained users. In an example, the techniques can be used to selectively disable one or more power hungry processing chains. In more detail, GPS signals which are transmitted from satellites are subject to ionospheric induced delay effects. A GPS receiver generally needs to compensate for these effects to avoid introducing errors in the navigation information generated from those signals. The ionospheric induced delay effects, which are time varying, can be estimated by measuring the rate of change of phase differ- ences between two frequency separated GPS signals (e.g., the L1 GPS signal and the L2 GPS signal). This measure- ment is referred to as a pedestal ionospheric delay measure- ment and it requires that the processing chains for both the L1 channel and the L2 channel be powered on and opera- tional. These processing chains within the GPS receiver include RF front ends and signal processers which can consume a significant portion of the receiver's power bud- get. To this end, and in accordance with such an example, a GPS receiver is configured to allow for one of the processing chains (e.g., for either the L1 or the L2 channel) to be powered off for periods of time during which the ionospheric delay may be estimated using just the remaining channel. During these periods, referred to as coasting periods, the ionospheric delay is estimated based on the rate of change of phase differences between the upper and lower sidebands of the signal in the channel that is powered on. Because the frequency separation between the upper and lower sidebands of the one signal (L1 or L2) is significantly less than the frequency separation between the L1 and L2 signals, the estimated ionospheric delay using just one channel is less accurate than the estimated delay that would be obtained using both signals. For this reason, the second channel is periodically powered back on, for short durations, to obtain new pedestal measurements to refine the estimate.

An example methodology implementing the techniques for power management of a GPS receiver includes calcu- lating the pedestal ionospheric delay based on the phase difference between a first GPS signal at a first center frequency and a second GPS signal at a second center frequency, and powering off the processing chain configured to provide the second GPS signal. The methodology further includes calculating, at periodic intervals, a secondary iono- spheric delay based on the phase difference between an upper sideband and a lower sideband of the first GPS signal and accumulating the differences between consecutively calculated secondary ionospheric delays. In response to the accumulated differences exceeding a threshold value, the methodology continues with powering on the processing chain configured to provide the second GPS signal and recalculating the pedestal ionospheric delay.

Although the techniques describe herein are applied to GPS signals, they may also be applied to other global navigation satellite systems that employ multiple frequency separated channels, such as the Galileo system.

It will be appreciated that the techniques described herein may provide reduced power consumption and longer oper- ating time, compared to GPS receivers that keep both L1 and L2 processing channels powered up and operating continu- ously in a non-selective manner. Numerous embodiments and applications will be apparent in light of this disclosure.

System Architecture

FIG. 1 illustrates a GPS receiver 100 with ionospheric delay based power management, configured in accordance with certain embodiments of the present disclosure. The GPS receiver 100 is shown to include an antenna 110, an L1 processor 120, an L2 processor 130, and an ionospheric delay based power manager 140. The antenna 110 is configured to receive signals from a GPS satellite and provide those signals to the L1 processor 120 and the L2 processor 130. The L1 and L2 processors are also referred to herein as processing chains and may include RF front end components such as amplifiers, frequency down converters, and filters, as well as signal processing functions including decoding and decryption. The L1 processor 120 is configured to acquire, decode, and process information encoded in the L1 signal, to generate timing and navigation information. The L2 processor 130 is similarly configured to acquire, decode, and process information encoded in the L2 signal.

The structure of the L1 and L2 signals, and the operation of ionospheric delay based power manager 140, are described in greater detail below. At a high level, however, the ionospheric delay based power manager 140 is configured to power off one of the processing chains (e.g., either the L1 or the L2 channel) for periods of time during which the ionospheric delay is estimated, using only the one remaining channel, based on the upper and lower sidebands of the signal in that channel. In the description that follows, the L2 processing chain will be used as the example to be powered off (e.g., using the L2 power on/off signal 150), however it will be appreciated that in other embodiments, the L1 processing chain could be the chain that is powered off.

Figure 2:
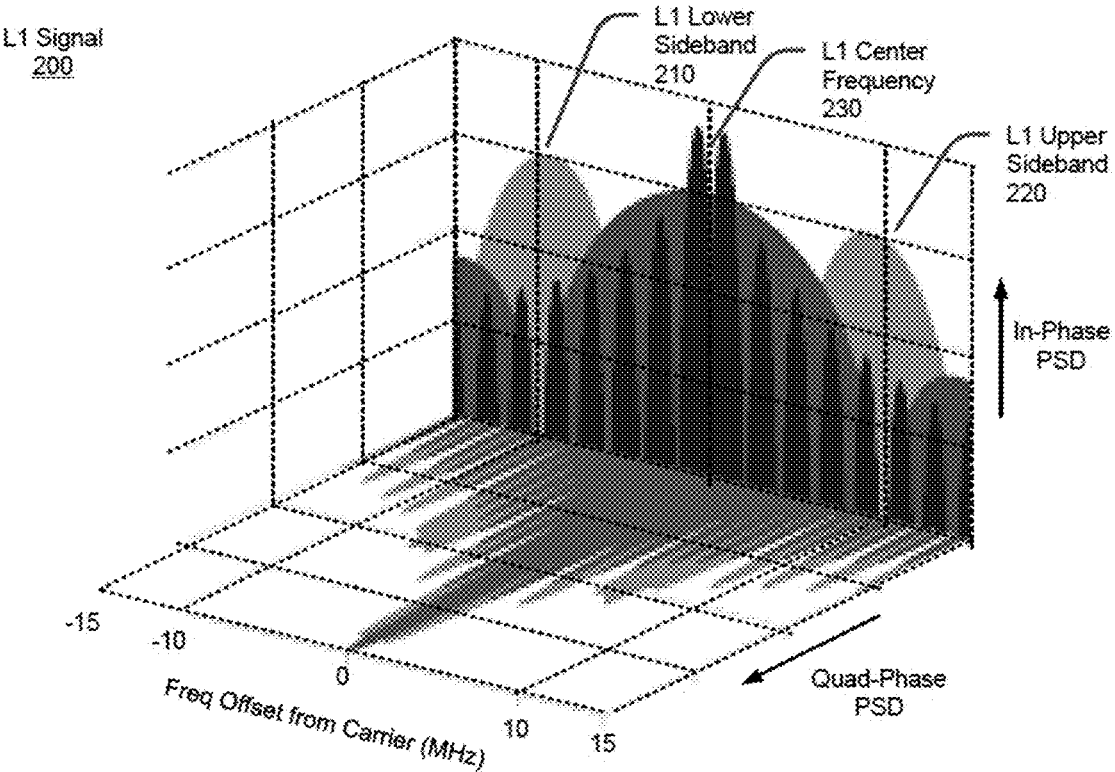
FIG. 2 illustrates power spectra of GPS signals, in accordance with certain embodiments of the present disclosure.
Figure 2:
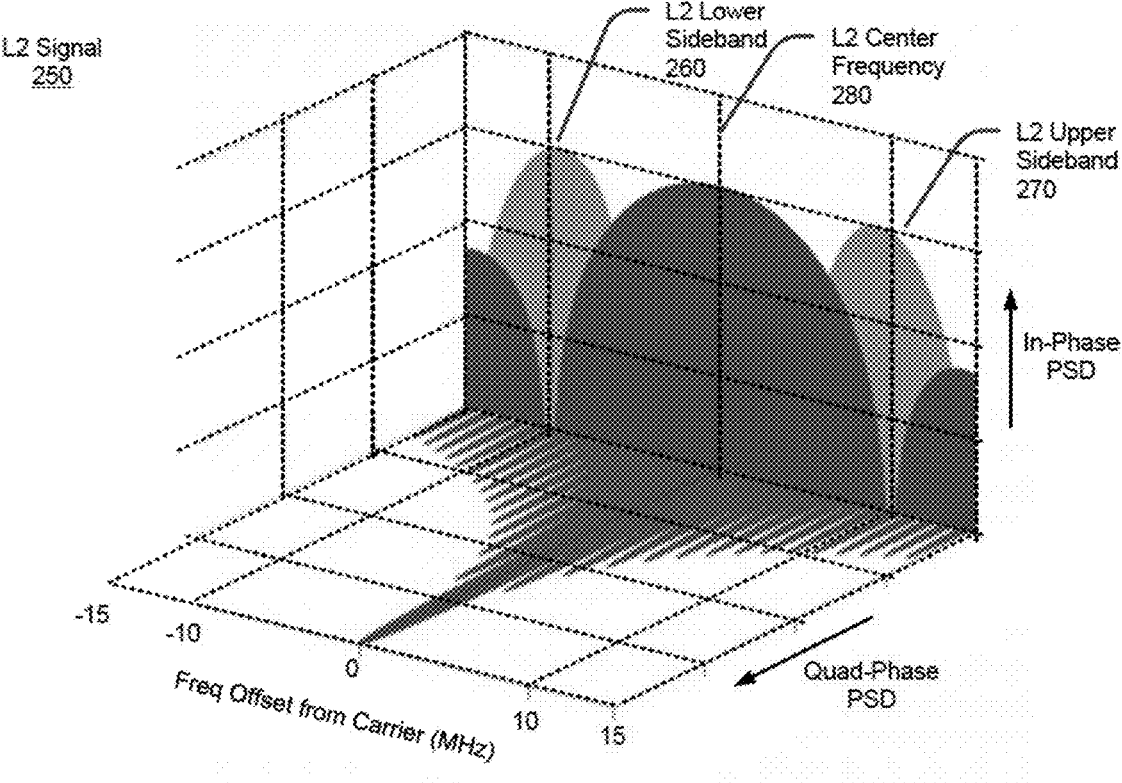

FIG. 2 illustrates power spectra of GPS signals L1 200 and L2 250, in accordance with certain embodiments of the present disclosure. In particular, for both signals, the in-phase power spectral density (which includes the GPS military code or M-code) is plotted on the vertical plane and the quadrature phase power spectral density is plotted on the horizontal plane. The L1 and L2 M-code signals are substantially similar in that they both comprise upper and lower sideband modulation, illustrated for example as 220, 210 for L1, and 270, 260 for L2. The L1 and L2 signals are relatively widely separated in frequency. For example, the L1 carrier wave center frequency 230 is located at 1575.42 MHz while the L2 carrier wave center frequency 280 is located at 1227.60 MHz, providing a spectral separation of 347.82 MHz. For both signals, L1 and L2, the upper and lower sidebands are spectrally separated from the carrier wave frequency by 20.46 MHz.

The ionosphere layer of the Earth overlaps the top of the atmosphere and the boundary of outer space. It comprises a plasma that is generated by solar radiation bombardment of atmospheric gases. The plasma is not uniformly distributed around the planet, rather, it varies by latitude and by localized influence of solar radiation. Because the plasma is electrically charged, it introduces delay to radio frequency (RF) signals as they pass through. These delays are both frequency dependent and LOS elevation/azimuth angle dependent (due to the non-uniform distribution of the layer). When the L1 and L2 signals pass through the ionosphere they incur different delays due to the frequency separation between those signals. The difference in frequency delays between the L1 and L2 signal is relatively larger than the difference in frequency delays between the upper and lower sidebands of either of the signals due to the greater frequency separation between the L1 and L2 signals compared to the frequency separation between the sidebands of either signal.

Figure 3:
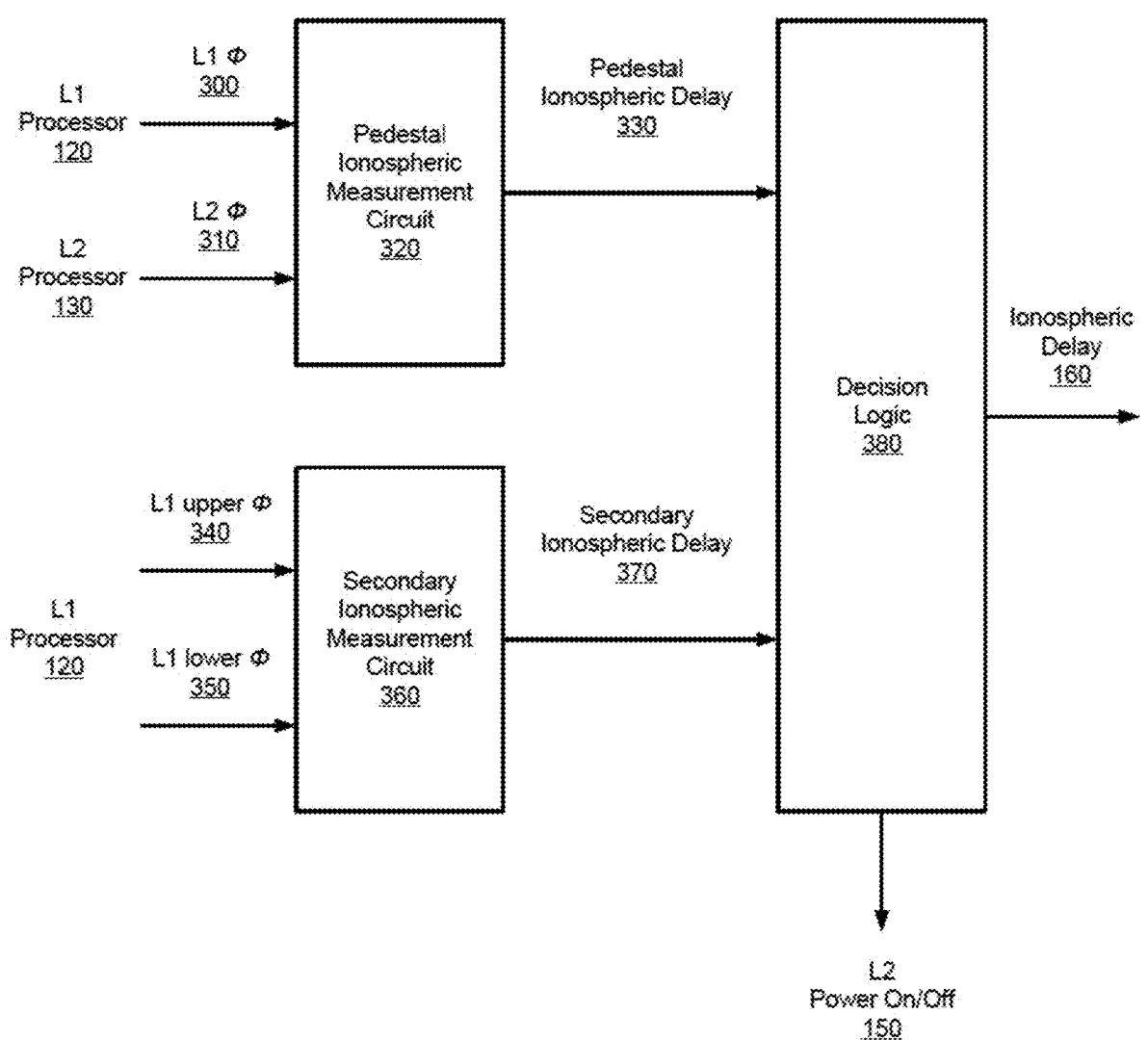
FIG. 3 is a block diagram of an ionospheric delay based power manager of the GPS receiver of FIG. 1, configured in accordance with certain embodiments of the present disclosure.

FIG. 3 is a block diagram of an ionospheric delay based power manager 140 of the GPS receiver 100 of FIG. 1, configured in accordance with certain embodiments of the present disclosure. The ionospheric delay based power manager 140 is shown to include a pedestal ionospheric measurement circuit 320, a secondary ionospheric measurement circuit 360, and a decision logic circuit 380, the operations of which will be described in greater detail below. At a high level, however, the pedestal ionospheric measurement circuit 320 is configured to provide an estimate of the delay based on both L1 and L2 signals while the secondary ionospheric measurement circuit 360 is configured to provide an estimate of the delay based on just the L1 signal. The decision logic circuit 380 is configured to power on and power off the L2 processing chain based on measured drift of the delay estimate provided by the secondary ionospheric measurement circuit 360.

Figure 4:
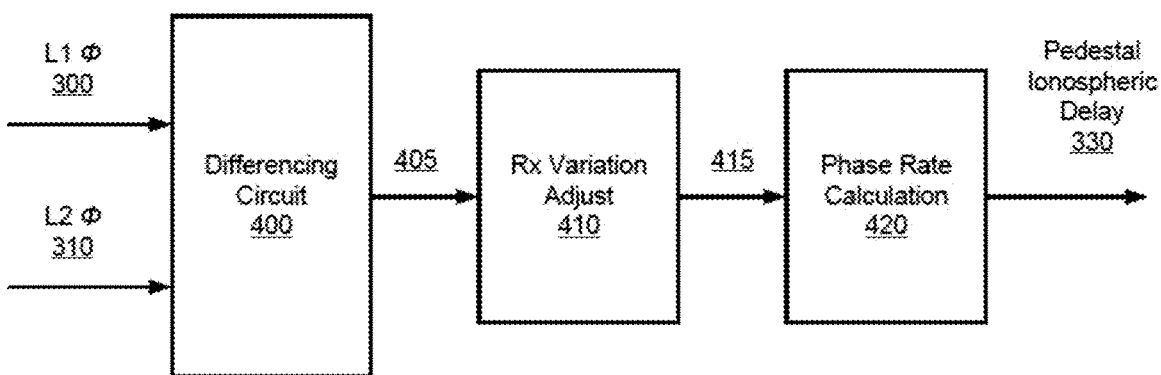
FIG. 4 is a block diagram of the pedestal ionospheric measurement circuit of the power manager of FIG. 3, configured in accordance with certain embodiments of the present disclosure.

FIG. 4 is a block diagram of the pedestal ionospheric measurement circuit 320 of the power manager 140 of FIG. 3, configured in accordance with certain embodiments of the present disclosure. The pedestal ionospheric measurement circuit 320 is shown to include a differencing circuit 400, a receiver variation adjustment circuit 410, and a phase rate calculation circuit 420.

As noted previously, the L1 processor 120 is configured to acquire, decode, and process information encoded in the L1 signal, to generate timing and navigation information. As part of this process, an L1 phase 300 is calculated and provided to the pedestal ionospheric measurement circuit 320 at time intervals associated with a suitable sampling rate. The L1 phase 300 is the instantaneous phase at the center frequency of the L1 signal at the particular measurement time. Similarly, the L2 processor 130 is configured to provide an L2 phase 310 to the pedestal ionospheric measurement circuit 320, representing the instantaneous phase at the center frequency of the L2 signal.

The differencing circuit 400 is configured to calculate the phase difference 405 between the L1 phase 300 and the L2 phase 310.

The receiver variation adjustment circuit 410 is configured to adjust the phase difference 405 to correct for any known (e.g., pre-characterized) receiver errors that may be induced on the signal. In some embodiments, the pre-characterized receiver errors may be determined, for example, through a calibration process in which a known signal is applied and deviations from expected results are measured.

The phase rate calculation circuit 420 is configured to calculate the rate of change of the corrected delta phases 415 over time. The rate of change of the phase differences over time is referred to as delay velocity. In some embodiments, delay velocity may be calculated as the difference in consecutive instantaneous corrected delta phase values 415 divided by the time interval between those values. The calculated delay velocity, based on the L1 and L2 signals, is provided to the decision logic circuit 380 as the pedestal ionospheric delay 330. After providing the pedestal ionospheric delay 330 to the decision logic circuit 380, the decision logic circuit may power off the L2 processing chain, for example using the L2 power on/off signal 150.

Figure 5:
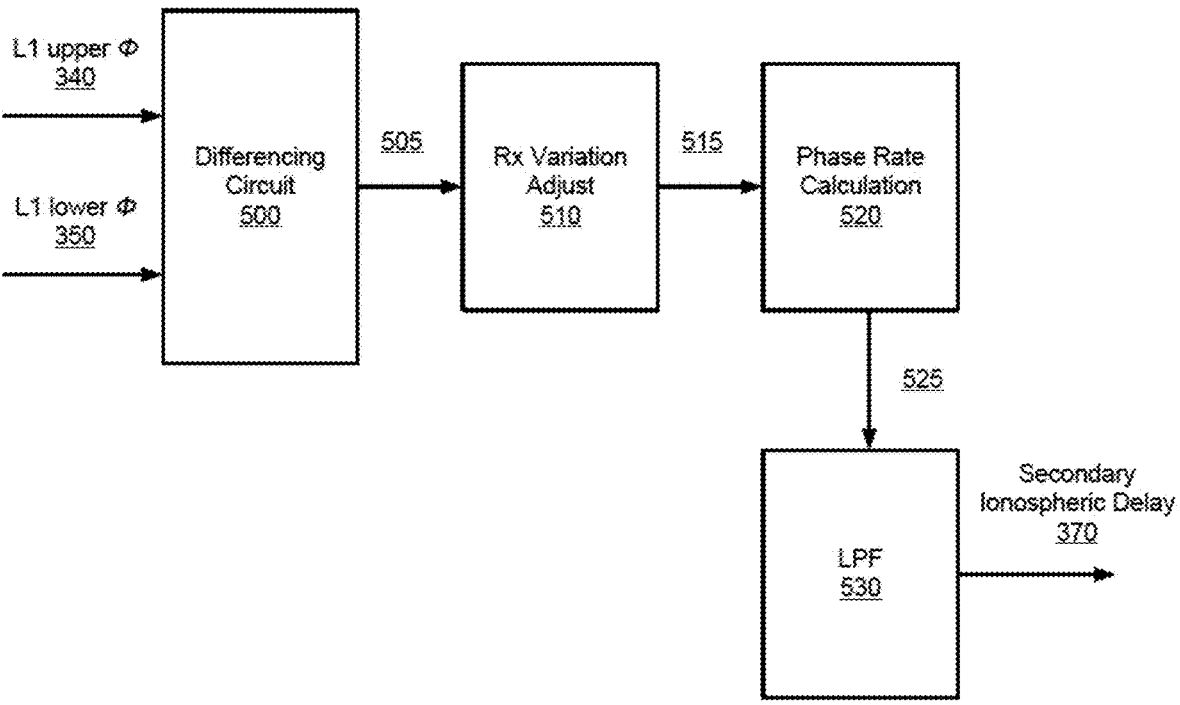
FIG. 5 is a block diagram of the secondary ionospheric measurement circuit of the power manager of FIG. 3, configured in accordance with certain embodiments of the present disclosure.

FIG. 5 is a block diagram of the secondary ionospheric measurement circuit 360 of the power manager 140 of FIG. 3, configured in accordance with certain embodiments of the present disclosure. The secondary ionospheric measurement circuit 360 is shown to include a differencing circuit 500, a receiver variation adjustment circuit 510, a phase rate calculation circuit 520, and a low pass filter 530.

In addition to the functions described above, the L1 processor 120 is also configured to calculate an L1 upper sideband phase 340 and an L1 lower sideband phase 350 which are provided to the secondary ionospheric measurement circuit 360.

The differencing circuit 500 is configured to calculate the phase difference 505 between the L1 upper sideband phase 340 and the L1 lower sideband phase 350.

The receiver variation adjustment circuit 510 is configured to adjust the phase difference 505 to correct for any known (e.g., pre-characterized) receiver errors that may be induced on the signal. In some embodiments, the pre-characterized receiver errors may be determined, for example, through a calibration process in which a known signal is applied and deviations from expected results are measured.

The phase rate calculation circuit 520 is configured to calculate the rate of change of the corrected delta phases 515 over time. The rate of change of the phase differences over time is referred to as delay velocity. In some embodiments, delay velocity 525 may be calculated as the difference in consecutive instantaneous corrected delta phase values 515 divided by the time interval between those values.

Because the frequency separation between the upper and lower sidebands is significantly less than the frequency separation between the L1 and L2 signals, the delay velocity 525 may include more noise. The low pass filter 530 is configured to low pass filter (e.g., smooth) the corrected delay velocity 525 to reduce high frequency noise. Parameters for the low pass filter, such as cutoff frequency, may be determined based on the application (e.g., ground, airborne, weapons systems). The low pass filtered delay velocity, based on the upper and lower sidebands of the L1 signal, is provided to the decision logic circuit 380 as the secondary ionospheric delay 370.

Figure 6:
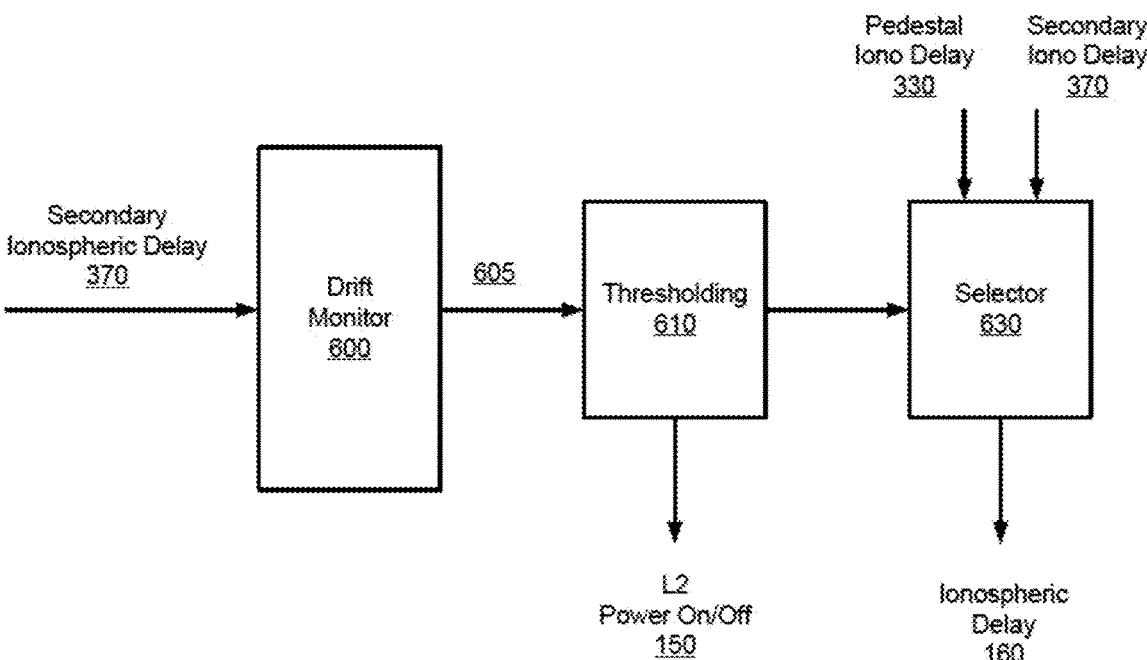
FIG. 6 is a block diagram of the decision logic of the power manager of FIG. 3, configured in accordance with certain embodiments of the present disclosure.

FIG. 6 is a block diagram of the decision logic circuit 380 of the power manager 140 of FIG. 3, configured in accordance with certain embodiments of the present disclosure. The decision logic circuit 380 is shown to include a drift monitor 600, a thresholding circuit 610, and a selector circuit 630.

The drift monitor 600 is configured to accumulate differences between consecutively calculated secondary ionospheric delays 370 over time. The accumulated differences represent drift 605 of the estimated ionospheric delays (based on just the upper and lower side bands) over time.

The thresholding circuit 610 is configured to compare the drift 605 to a threshold value. The threshold value represents a maximum acceptable drift beyond which a new pedestal ionospheric delay needs to be calculated. In some embodiments, the threshold value may be dependent on the application and/or chosen based on simulations. When the drift 605 exceeds the threshold value, the L2 processing chain is powered back on, for example using the L2 power on/off signal 150, so that a new pedestal ionospheric delay can be calculated.

The selector circuit 630 is configured to provide the ionospheric delay measurement 160 by selecting the pedestal ionospheric delay 330 during periods when the L2 processing chain is powered on and selecting the secondary ionospheric delay 370 during periods when the L2 processing chain is powered off.

In some embodiments, the pedestal ionospheric measurement circuit 320, the secondary ionospheric measurement circuit 360, and the decision logic circuit 380 may be implemented as one or more processors configured to execute software to perform the functions of blocks 320, 360, and 380.

Methodology

Figure 7:
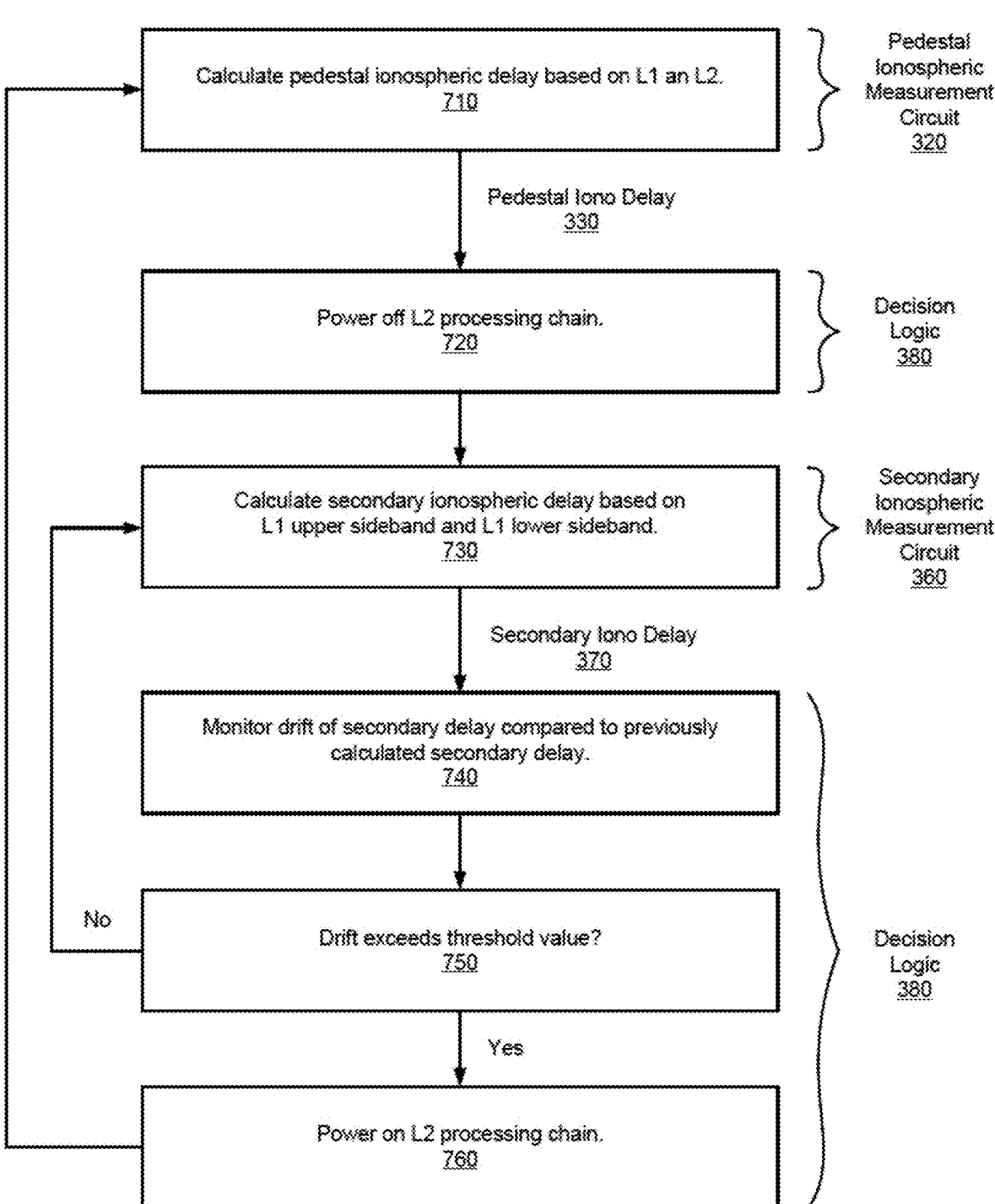
FIG. 7 is a flowchart illustrating a methodology for ionospheric delay based power management, in accordance with an embodiment of the present disclosure.

FIG. 7 is a flowchart illustrating a methodology 700 for ionospheric delay based power management, in accordance with an embodiment of the present disclosure. As can be seen, example method 700 includes a number of phases and sub-processes, the sequence of which may vary from one embodiment to another. However, when considered in aggregate, these phases and sub-processes form a process for operation of an ionospheric delay based power manager 140, in accordance with certain of the embodiments disclosed herein, for example as illustrated in FIGS. 1-6, as described above. However other system architectures can be used in other embodiments, as will be apparent in light of this disclosure. To this end, the correlation of the various functions shown in FIG. 7 to the specific components illustrated in the figures, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 700 commences, at operation 710, by calculating a pedestal ionospheric delay based on the phase difference between a first GPS signal at a first center frequency and a second GPS signal at a second center frequency. In some embodiments, the pedestal ionospheric delay is calculated as a rate of change of the phase difference between the first GPS signal at the first center frequency and the second GPS signal at the second center frequency. In some embodiments, the first GPS signal is the GPS L1 signal, and the second GPS signal is the GPS L2 signal. In some other embodiments, the first GPS signal is the GPS L2 signal, and the second GPS signal is the GPS L1 signal.

At operation 720, the processing chain configured to provide the second GPS signal is powered off to reduce power consumption.

At operation 730, at periodic intervals, a secondary ionospheric delay is calculated based on the phase difference between the upper sideband and the lower sideband of the first GPS signal. In some embodiments, the secondary ionospheric delay is calculated as a low pass filtered rate of change of the phase difference between the upper sideband and the lower sideband of the first GPS signal at the first center frequency.

At operation 740, differences between consecutively calculated secondary ionospheric delays are accumulated to monitor drift in the secondary ionospheric delays over time.

At operation 750, if the accumulated differences exceed a threshold value, then at operation 760, the processing chain configured to provide the second GPS signal is powered back on and the process loops back to operation 710 to recalculate the pedestal ionospheric delay. Otherwise, the process loops back to operation 730 to recalculate a new secondary ionospheric delay.

In some embodiments, additional operations may be performed, as previously described in connection with the system. For example, an ionospheric delay measurement may be provided by selecting the pedestal ionospheric delay during periods when the processing chain configured to provide the second GPS signal is powered on, and selecting the secondary ionospheric delay during periods when the processing chain configured to provide the second GPS signal is powered off.

Example System

Figure 8:
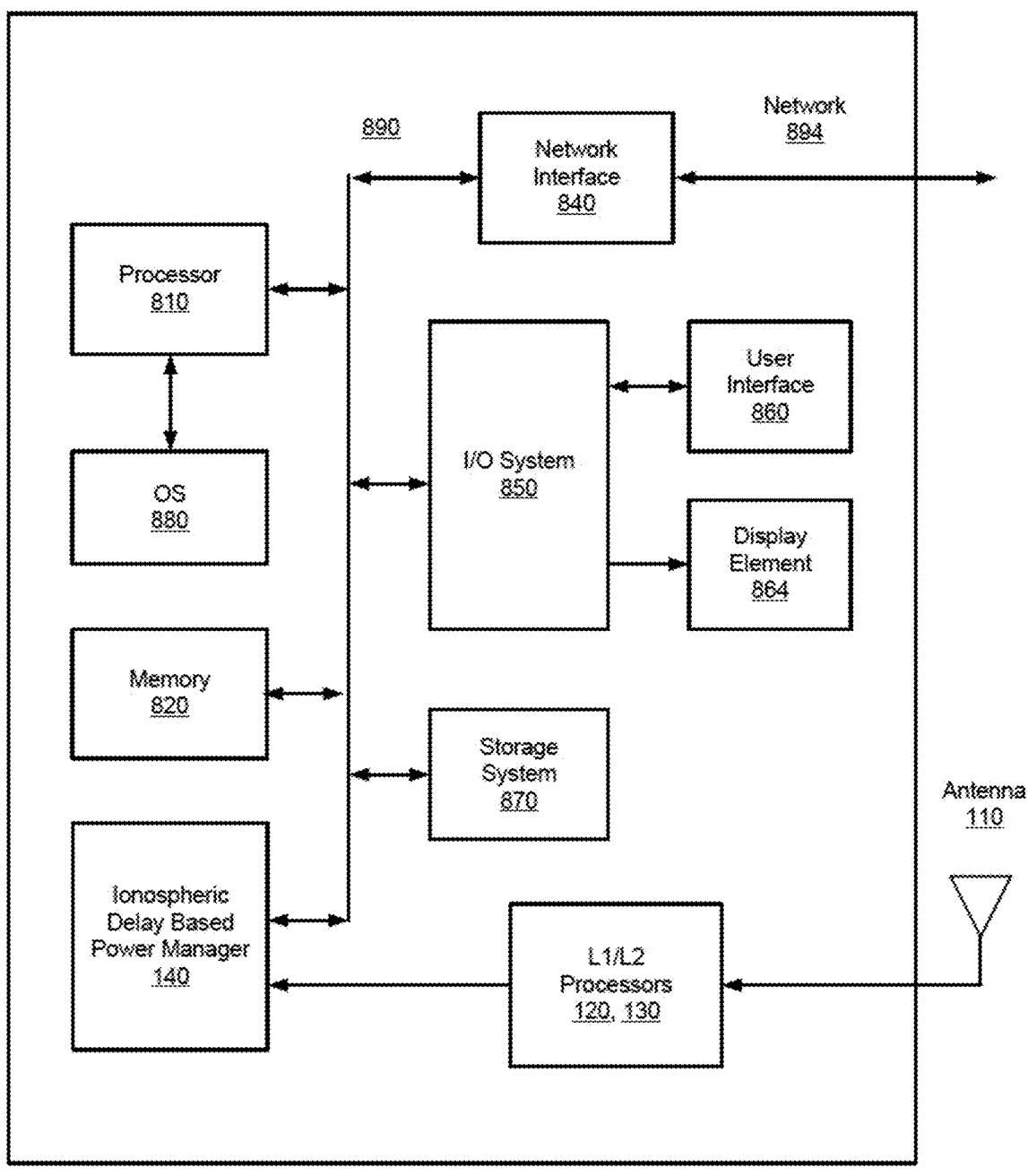
FIG. 8 is a block diagram of a processing platform configured to provide ionospheric delay based power management, in accordance with an embodiment of the present disclosure.

FIG. 8 is a block diagram of a processing platform 800 configured to provide ionospheric delay based power management for a GPS receiver, in accordance with an embodiment of the present disclosure. In some embodiments, platform 800, or portions thereof, may be hosted on, or otherwise be incorporated into the electronic systems of an aircraft or ship, including navigation systems, weapons systems, and the like, or in a man-portable satellite navigation system.

In some embodiments, platform 800 may comprise any combination of a processor 810, memory 820, a network interface 840, an input/output (I/O) system 850, a user interface 860, a display element 864, a storage system 870, ionospheric delay based power manager 140, L1 and L2 processors 120, 130, and one or more antennas 110. As can be further seen, a bus and/or interconnect 890 is also provided to allow for communication between the various components listed above and/or other components not shown. Platform 800 can be coupled to a network 894 through network interface 840 to allow for communications with other computing devices, platforms, devices to be controlled, or other resources. Other componentry and functionality not reflected in the block diagram of FIG. 8 will be apparent in light of this disclosure, and it will be appreciated that other embodiments are not limited to any particular hardware configuration.

Processor 810 can be any suitable processor, and may include one or more coprocessors or controllers, such as an audio processor, a graphics processing unit, or hardware accelerator, to assist in the execution of mission software and/or any control and processing operations associated with platform 800, including operation of the ionospheric delay based power manager 140. In some embodiments, the processor 810 may be implemented as any number of processor cores. The processor (or processor cores) may be any type of processor, such as, for example, a micro-processor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 810 may be implemented as a complex instruction set computer (CISC) or a reduced instruction set computer (RISC) processor. In some embodiments, processor 810 may be configured as an x86 instruction set compatible processor.

Memory 820 can be implemented using any suitable type of digital storage including, for example, flash memory and/or random access memory (RAM). In some embodiments, the memory 820 may include various layers of memory hierarchy and/or memory caches as are known to those of skill in the art. Memory 820 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 810 may be configured to execute an Operating System (OS) 880 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 800, and therefore may also be implemented using any suitable existing or subsequently-developed platform.

Network interface circuit 840 can be any appropriate network chip or chipset which allows for wired and/or wireless connection between other components of platform 800 and/or network 894, thereby enabling platform 800 to communicate with other local and/or remote computing systems, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 850 may be configured to interface between various I/O devices and other components of platform 800. I/O devices may include, but not be limited to, user interface 860 and display element 864. User interface 860 may include devices (not shown) such as a touchpad, cockpit display unit, keyboard, and mouse, etc., for example, to allow the user to control the system. Display element 864 may be configured to display information to a user. I/O system 850 may include a graphics subsystem configured to perform processing of images for rendering on the display element 864. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 810 or any chipset of platform 800.

It will be appreciated that in some embodiments, the various components of platform 800 may be combined or integrated in a system-on-a-chip (SoC) architecture. In some embodiments, the components may be hardware components, firmware components, software components or any suitable combination of hardware, firmware, or software.

Ionospheric delay based power manager 140 is configured to reduce power consumption of the GPS receiver by shutting down (e.g., powering off) one of the processing chains (e.g., the L1 or the L2 signal processing channel and associated front end), for coasting periods during which the ionospheric delay can be estimated using just one channel, as described previously. Ionospheric delay based power manager 140 may include any or all of the circuits/components illustrated in FIGS. 1-6, as described above. These components can be implemented or otherwise used in conjunction with a variety of suitable software and/or hardware that is coupled to or that otherwise forms a part of platform 800. These components can additionally or alternatively be implemented or otherwise used in conjunction with user I/O devices that are capable of providing information to, and receiving information and commands from, a user.

In various embodiments, platform 800 may be implemented as a wireless system, a wired system, or a combination of both. When implemented as a wireless system, platform 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic. NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 894. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 800 may comprise additional, fewer, or alternative subcomponents as compared to those included in the example embodiment of FIG. 8.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is a power management system for a global positioning system (GPS) receiver, the system comprising: a pedestal delay measurement circuit configured to calculate a pedestal ionospheric delay based on a phase difference between a first GPS signal at a first center frequency and a second GPS signal at a second center frequency; a secondary delay measurement circuit configured to calculate, at periodic intervals, a secondary ionospheric delay based on a phase difference between an upper sideband and a lower sideband of the first GPS signal; and a decision logic circuit configured to power off a processing chain configured to provide the second GPS signal, after the pedestal ionospheric delay is calculated.

Example 2 includes the system of Example 1, wherein the pedestal delay measurement circuit comprises: a differencing circuit configured to calculate the phase difference between the first GPS signal at the first center frequency and the second GPS signal at the second center frequency; and a phase rate calculation circuit configured to calculate the pedestal ionospheric delay as a rate of change of the phase differences between the first GPS signal at the first center frequency and the second GPS signal at the second center frequency over time.

Example 3 includes the system of Examples 1 or 2, wherein the secondary delay measurement circuit comprises: a differencing circuit configured to calculate the phase difference between the upper sideband and the lower sideband of the first GPS signal at the first center frequency; a phase rate calculation circuit configured to calculate the secondary ionospheric delay as a rate of change of the phase differences between the upper sideband and the lower sideband of the first GPS signal at the first center frequency over time; and a low pass filter configured to reduce high frequency noise in the secondary ionospheric delay.

Example 4 includes the system of any of Examples 1-3, wherein the decision logic circuit comprises: a drift monitor configured to accumulate differences between consecutively calculated secondary ionospheric delays; and a thresholding circuit configured to, in response to detecting that the accumulated differences exceed a threshold value, power on the processing chain configured to provide the second GPS signal, and cause the pedestal delay measurement circuit to recalculate the pedestal ionospheric delay.

Example 5 includes the system of Example 4, wherein the decision logic circuit comprises a selector circuit configured to provide an ionospheric delay measurement by selecting the pedestal ionospheric delay during periods when the processing chain configured to provide the second GPS signal is powered on, and selecting the secondary ionospheric delay during periods when the processing chain configured to provide the second GPS signal is powered off.

Example 6 includes the system of any of Examples 1-5, wherein the first GPS signal is a GPS L1 signal, and the second GPS signal is a GPS L2 signal.

Example 7 includes the system of any of Examples 1-6, wherein the first GPS signal is a GPS L2 signal, and the second GPS signal is a GPS L1 signal.

Example 8 includes the system of Example 1, wherein the pedestal delay measurement circuit, the secondary delay measurement circuit, and the decision logic circuit collectively include one or more processors and one or more processor-readable mediums encoded with instructions that when executed by the one or more processors cause a process to be carried out to: calculate the pedestal ionospheric delay based on the phase difference between the first GPS signal at the first center frequency and the second GPS signal at the second center frequency; calculate, at periodic intervals, the secondary ionospheric delay based on the phase difference between the upper sideband and the lower sideband of the first GPS signal; and power off the processing chain configured to provide the second GPS signal, after the pedestal ionospheric delay is calculated.

Example 9 is a computer program product including one or more non-transitory machine-readable mediums encoded with instructions that when executed by one or more processors cause a process to be carried out for power management of a global positioning system (GPS) receiver, the process comprising: calculating a pedestal ionospheric delay based on a phase difference between a first GPS signal at a first center frequency and a second GPS signal at a second center frequency; powering off a processing chain configured to provide the second GPS signal; calculating, at periodic intervals, a secondary ionospheric delay based on a phase difference between an upper sideband and a lower sideband of the first GPS signal; accumulating differences between consecutively calculated secondary ionospheric delays; and in response to the accumulated differences exceeding a threshold value, powering on the processing chain configured to provide the second GPS signal and recalculating the pedestal ionospheric delay.

Example 10 includes the computer program product of Example 9, wherein the process comprises calculating the pedestal ionospheric delay as a rate of change of the phase difference between the first GPS signal at the first center frequency and the second GPS signal at the second center frequency.

Example 11 includes the computer program product of Examples 9 or 10, wherein the process comprises calculating the secondary ionospheric delay as a low pass filtered rate of change of the phase difference between the upper sideband and the lower sideband of the first GPS signal at the first center frequency.

Example 12 includes the computer program product of any of Examples 9-11, wherein the process comprises providing an ionospheric delay measurement by selecting the pedestal ionospheric delay during periods when the processing chain configured to provide the second GPS signal is powered on.

Example 13 includes the computer program product of any of Examples 9-12, wherein the process comprises providing an ionospheric delay measurement by selecting the secondary ionospheric delay during periods when the processing chain configured to provide the second GPS signal is powered off.

Example 14 includes the computer program product of any of Examples 9-13, wherein the first GPS signal is a GPS L1 signal, and the second GPS signal is a GPS L2 signal, or the first GPS signal is a GPS L2 signal, and the second GPS signal is a GPS L1 signal.

Example 15 is a method for power management of a global positioning system (GPS) receiver, the method comprising: calculating a pedestal ionospheric delay based on a phase difference between a first GPS signal at a first center frequency and a second GPS signal at a second center frequency; powering off a processing chain configured to provide the second GPS signal; calculating, at periodic intervals, a secondary ionospheric delay based on a phase difference between an upper sideband and a lower sideband of the first GPS signal; accumulating differences between consecutively calculated secondary ionospheric delays; and in response to the accumulated differences exceeding a threshold value, powering on the processing chain configured to provide the second GPS signal and recalculating the pedestal ionospheric delay.

Example 16 includes the method of Example 15, comprising calculating the pedestal ionospheric delay as a rate of change of the phase difference between the first GPS signal at the first center frequency and the second GPS signal at the second center frequency.

Example 17 includes the method of Examples 15 or 16, comprising calculating the secondary ionospheric delay as a low pass filtered rate of change of the phase difference between the upper sideband and the lower sideband of the first GPS signal at the first center frequency.

Example 18 includes the method of any of Examples 15-17, comprising providing an ionospheric delay measurement by selecting the pedestal ionospheric delay during periods when the processing chain configured to provide the second GPS signal is powered on.

Example 19 includes the method of any of Examples 15-18, comprising providing an ionospheric delay measurement by selecting the secondary ionospheric delay during periods when the processing chain configured to provide the second GPS signal is powered off.

Example 20 includes the method of any of Examples 15-19, wherein the first GPS signal is a GPS L1 signal, and the second GPS signal is a GPS L2 signal, or the first GPS signal is a GPS L2 signal, and the second GPS signal is a GPS L1 signal.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A power management system for a global positioning system (GPS) receiver, the system comprising:
   a pedestal delay measurement circuit configured to calculate a pedestal ionospheric delay based on a phase difference between a first GPS signal at a first center frequency and a second GPS signal at a second center frequency;
   a secondary delay measurement circuit configured to calculate, at periodic intervals, a secondary ionospheric delay based on a phase difference between an upper sideband and a lower sideband of the first GPS signal; and
   a decision logic circuit configured to power off a processing chain configured to provide the second GPS signal, after the pedestal ionospheric delay is calculated.

2. The system of claim 1, wherein the pedestal delay measurement circuit comprises:
   a differencing circuit configured to calculate the phase difference between the first GPS signal at the first center frequency and the second GPS signal at the second center frequency; and a phase rate calculation circuit configured to calculate the pedestal ionospheric delay as a rate of change of the phase differences between the first GPS signal at the first center frequency and the second GPS signal at the second center frequency over time.

3. The system of claim 1, wherein the secondary delay measurement circuit comprises:

a differencing circuit configured to calculate the phase difference between the upper sideband and the lower sideband of the first GPS signal at the first center frequency;

a phase rate calculation circuit configured to calculate the secondary ionospheric delay as a rate of change of the phase differences between the upper sideband and the lower sideband of the first GPS signal at the first center frequency over time; and a low pass filter configured to reduce high frequency noise in the secondary ionospheric delay.

4. The system of claim 1, wherein the decision logic circuit comprises:

a drift monitor configured to accumulate differences between consecutively calculated secondary ionospheric delays; and a thresholding circuit configured to, in response to detecting that the accumulated differences exceed a threshold value, power on the processing chain configured to provide the second GPS signal, and cause the pedestal delay measurement circuit to recalculate the pedestal ionospheric delay.

5. The system of claim 4, wherein the decision logic circuit comprises a selector circuit configured to provide an ionospheric delay measurement by selecting the pedestal ionospheric delay during periods when the processing chain configured to provide the second GPS signal is powered on, and selecting the secondary ionospheric delay during periods when the processing chain configured to provide the second GPS signal is powered off.

6. The system of claim 1, wherein the first GPS signal is a GPS L1 signal, and the second GPS signal is a GPS L2 signal.

7. The system of claim 1, wherein the first GPS signal is a GPS L2 signal, and the second GPS signal is a GPS L1 signal.

8. The system of claim 1, wherein the pedestal delay measurement circuit, the secondary delay measurement circuit, and the decision logic circuit collectively include one or more processors and one or more processor-readable mediums encoded with instructions that when executed by the one or more processors cause a process to be carried out to: calculate the pedestal ionospheric delay based on the phase difference between the first GPS signal at the first center frequency and the second GPS signal at the second center frequency; calculate, at periodic intervals, the secondary ionospheric delay based on the phase difference between the upper sideband and the lower sideband of the first GPS signal; and power off the processing chain configured to provide the second GPS signal, after the pedestal ionospheric delay is calculated.

9. A computer program product including one or more non-transitory machine-readable mediums encoded with instructions that when executed by one or more processors cause a process to be carried out for power management of a global positioning system (GPS) receiver, the process comprising:

calculating a pedestal ionospheric delay based on a phase difference between a first GPS signal at a first center frequency and a second GPS signal at a second center frequency;

powering off a processing chain configured to provide the second GPS signal;

calculating, at periodic intervals, a secondary ionospheric delay based on a phase difference between an upper sideband and a lower sideband of the first GPS signal;

accumulating differences between consecutively calculated secondary ionospheric delays; and in response to the accumulated differences exceeding a threshold value, powering on the processing chain configured to provide the second GPS signal and recalculating the pedestal ionospheric delay.

10. The computer program product of claim 9, wherein the process comprises calculating the pedestal ionospheric delay as a rate of change of the phase difference between the first GPS signal at the first center frequency and the second GPS signal at the second center frequency.

11. The computer program product of claim 9, wherein the process comprises calculating the secondary ionospheric delay as a low pass filtered rate of change of the phase difference between the upper sideband and the lower sideband of the first GPS signal at the first center frequency.

12. The computer program product of claim 9, wherein the process comprises providing an ionospheric delay measurement by selecting the pedestal ionospheric delay during periods when the processing chain configured to provide the second GPS signal is powered on.

13. The computer program product of claim 9, wherein the process comprises providing an ionospheric delay measurement by selecting the secondary ionospheric delay during periods when the processing chain configured to provide the second GPS signal is powered off.

14. The computer program product of claim 9, wherein the first GPS signal is a GPS L1 signal, and the second GPS signal is a GPS L2 signal, or the first GPS signal is a GPS L2 signal, and the second GPS signal is a GPS L1 signal.

15. A method for power management of a global positioning system (GPS) receiver, the method comprising:

calculating a pedestal ionospheric delay based on a phase difference between a first GPS signal at a first center frequency and a second GPS signal at a second center frequency;

powering off a processing chain configured to provide the second GPS signal;

calculating, at periodic intervals, a secondary ionospheric delay based on a phase difference between an upper sideband and a lower sideband of the first GPS signal;

accumulating differences between consecutively calculated secondary ionospheric delays; and in response to the accumulated differences exceeding a threshold value, powering on the processing chain configured to provide the second GPS signal and recalculating the pedestal ionospheric delay.

16. The method of claim 15, comprising calculating the pedestal ionospheric delay as a rate of change of the phase difference between the first GPS signal at the first center frequency and the second GPS signal at the second center frequency.

17. The method of claim 15, comprising calculating the secondary ionospheric delay as a low pass filtered rate of change of the phase difference between the upper sideband and the lower sideband of the first GPS signal at the first center frequency.

18. The method of claim 15, comprising providing an ionospheric delay measurement by selecting the pedestal ionospheric delay during periods when the processing chain configured to provide the second GPS signal is powered on.

19. The method of claim 15, comprising providing an ionospheric delay measurement by selecting the secondary ionospheric delay during periods when the processing chain configured to provide the second GPS signal is powered off.

20. The method of claim 15, wherein the first GPS signal is a GPS L1 signal, and the second GPS signal is a GPS L2 signal, or the first GPS signal is a GPS L2 signal, and the second GPS signal is a GPS L1 signal.

* * * * *